H. I. WEED.
EDIBLE NUT CRACKER.
APPLICATION FILED APR. 2, 1909.

956,555.

Patented May 3, 1910.

WITNESSES:

INVENTOR
Helen Isabella Weed,
By her Attorney

UNITED STATES PATENT OFFICE.

HELEN ISABELLA WEED, OF BUFFALO, NEW YORK.

EDIBLE-NUT CRACKER.

956,555.　　　　Specification of Letters Patent.　　Patented May 3, 1910.

Application filed April 2, 1909. Serial No. 487,514.

*To all whom it may concern:*

Be it known that I, HELEN ISABELLA WEED, a citizen of the United States, residing at Buffalo, in the county of Erie and the State of New York, have invented certain new and useful Improvements in Edible-Nut Crackers, of which the following is a specification.

My invention relates to improvements in nut crackers, with the object of supporting the nut, to be cracked, in an inexpensive and portable means, adapted for this purpose.

Figure 1:
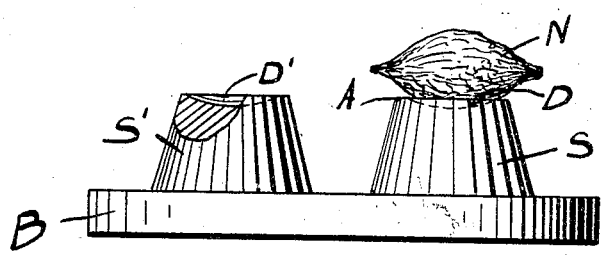
Figure 2:
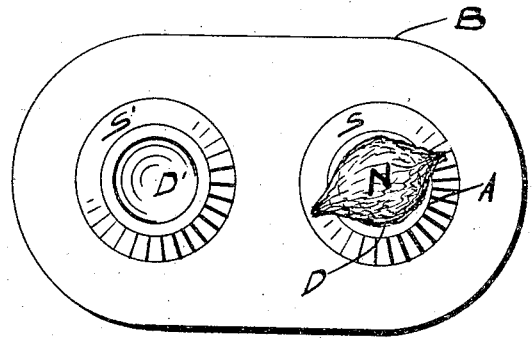

My device is illustrated in elevation in Figure 1, and in plan in Fig. 2.

In the figures, a nut N is shown resting in a depression D, in the apex A of a conical support S on the base B. S' is another conical support on the base B similar to the support S, but shown partially broken away to better illustrate the depression D'. The nut N may be conveniently held in the depression D by the operator to receive a blow from a hammer or the like, while the fingers of the operator rest in any circumferential position about the support S. The depressions D and D' may vary in size and form as desired. One or any number of supports similar to S and S' may be had upon the base B; besides, any variation in design, other than that illustrated in the figures, may be used, that comes within the scope of my invention as defined in the claim, hence I do not wish to be confined to the exact form of my invention shown in the figures.

I claim:

In a nut cracker, a base, one or more conical supports on said base, each of said supports containing a smooth depression in the apex thereof, adapted to receive a nut when held in any circumferential position by the operator, substantially as set forth.

HELEN ISABELLA WEED.

Witnesses:
 C. O. FALLER,
 J. EDW. THEBAUD.